Figures 1, 9:
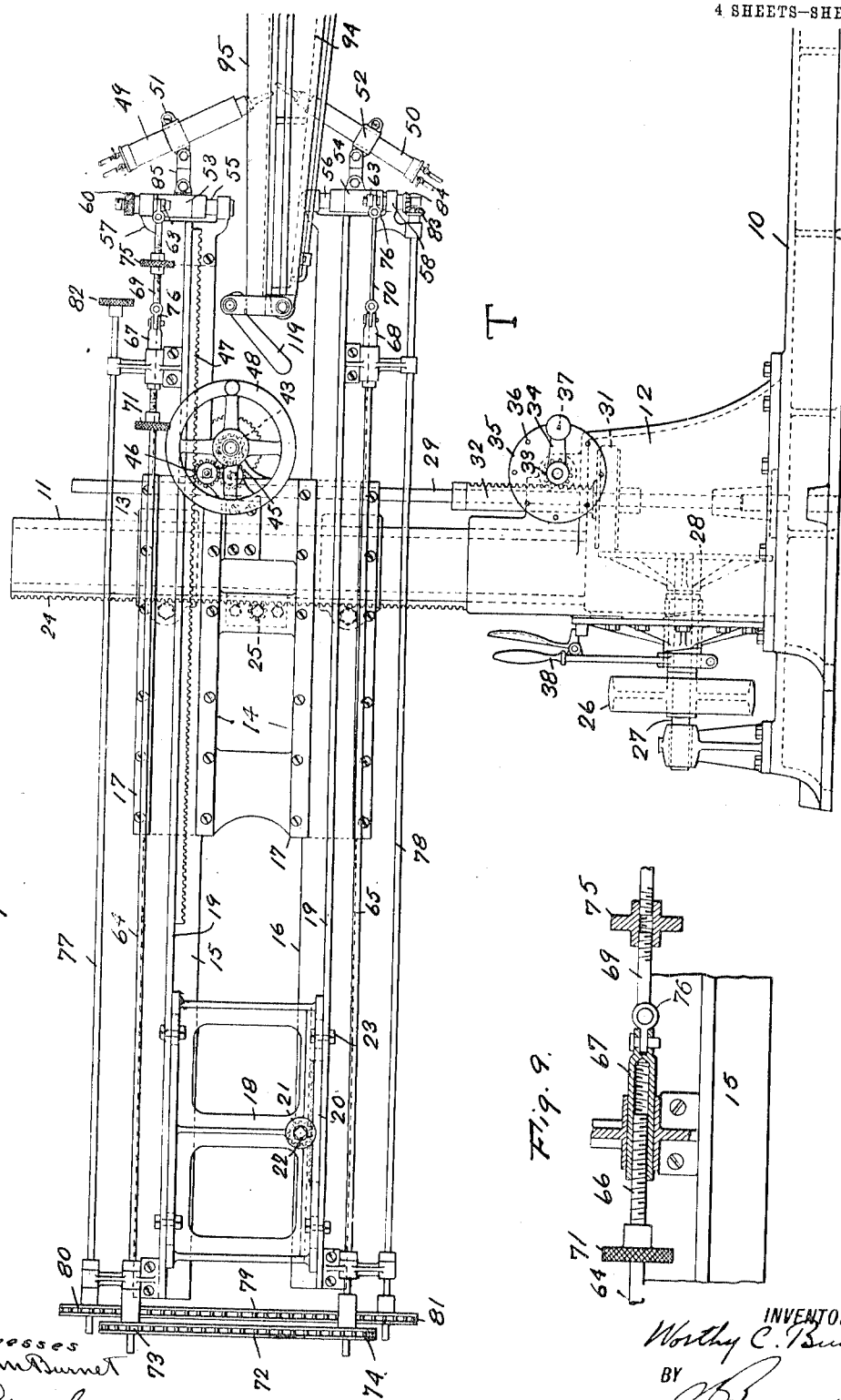

W. C. BUCKNAM.
BARREL WELDING MACHINE.
APPLICATION FILED JAN. 19, 1914.

1,118,327.

Patented Nov. 24, 1914.
4 SHEETS—SHEET 1.

Witnesses
M M Burnet
E. Greenberger

INVENTOR
Worthy C. Bucknam
BY
ATTORNEY

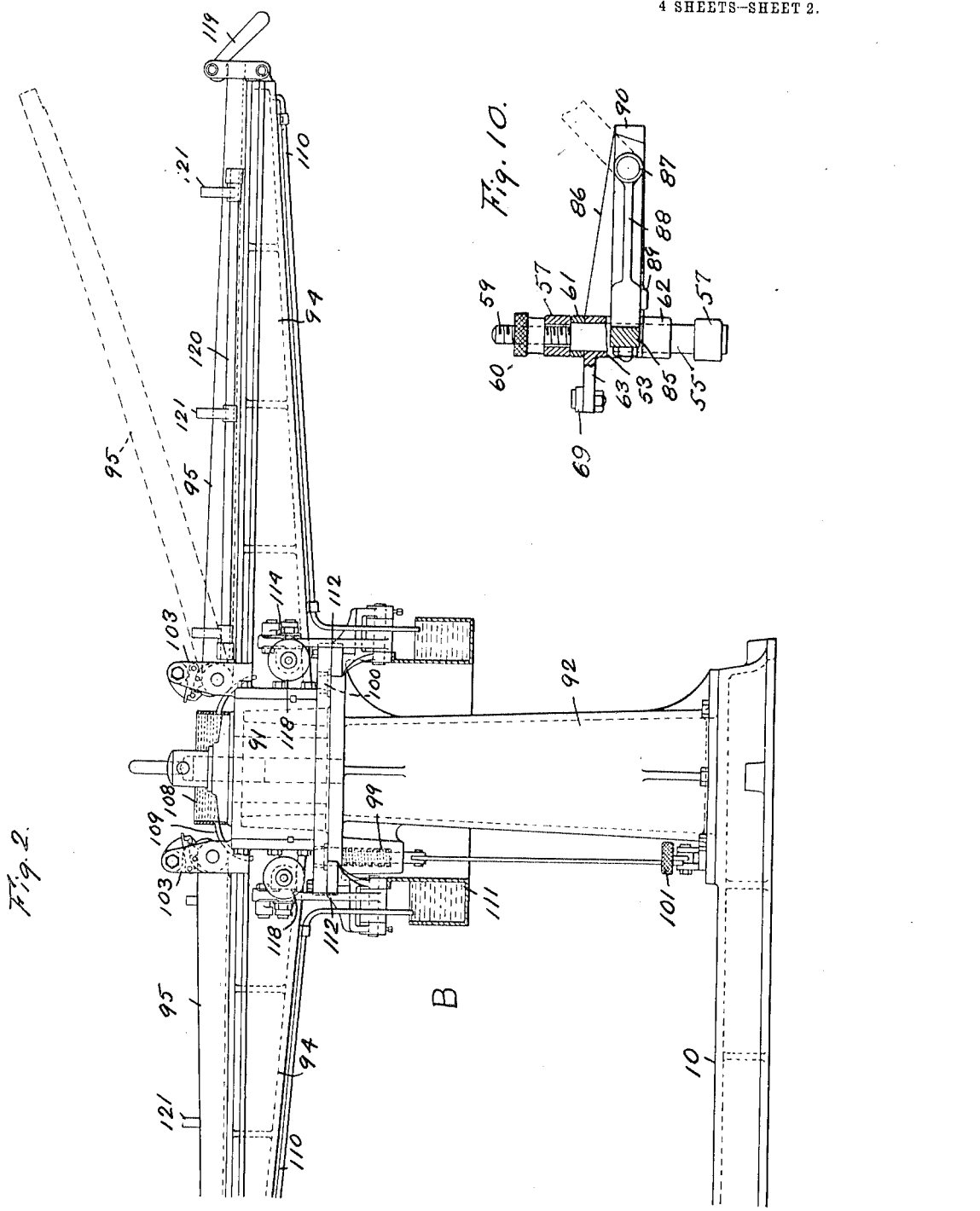

W. C. BUCKNAM.
BARREL WELDING MACHINE.
APPLICATION FILED JAN. 19, 1914.
1,118,327.
Patented Nov. 24, 1914.
4 SHEETS—SHEET 3.
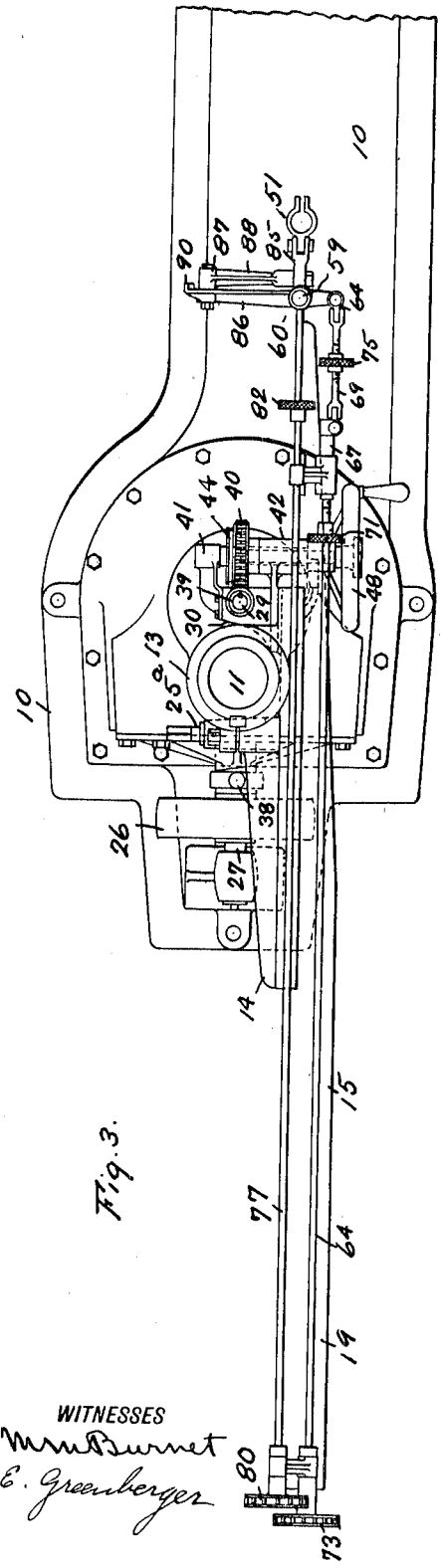
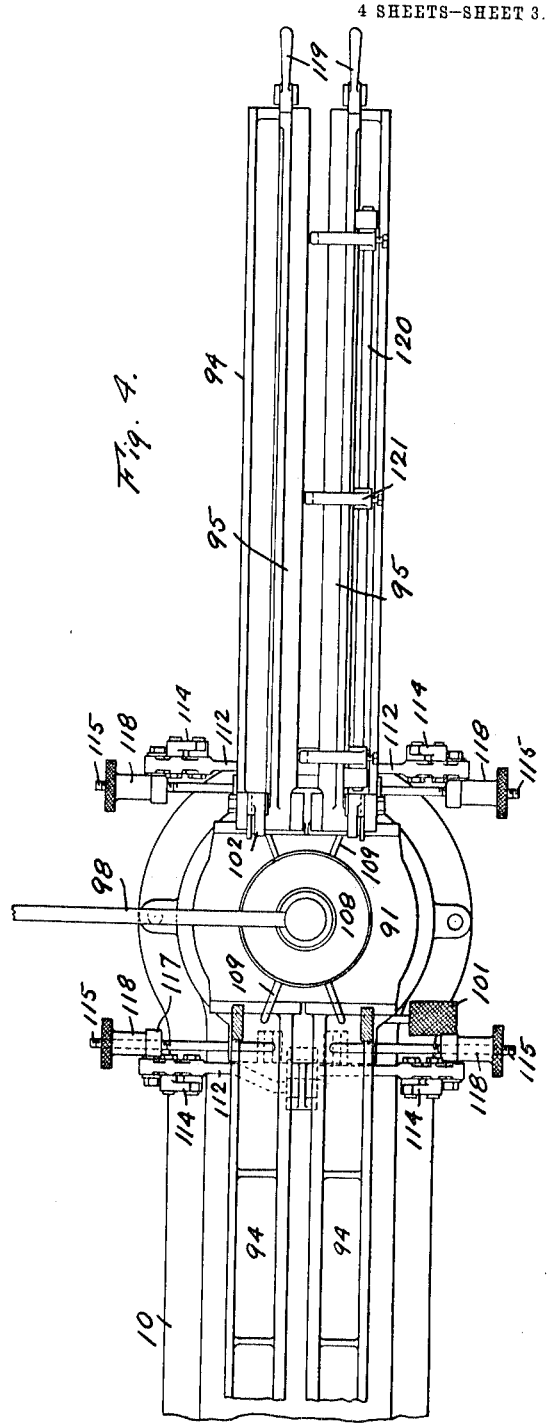

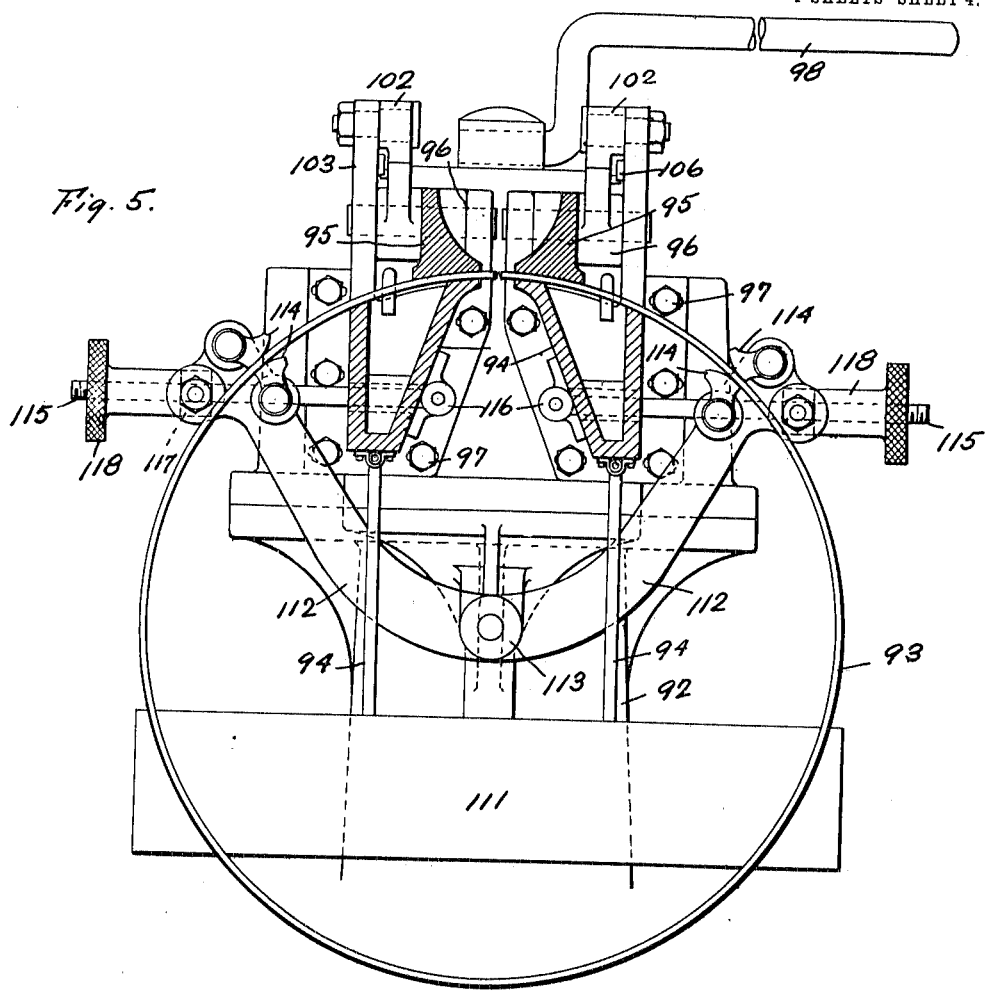
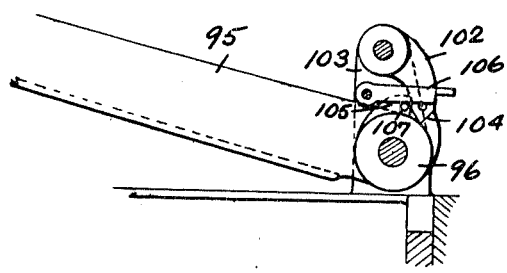
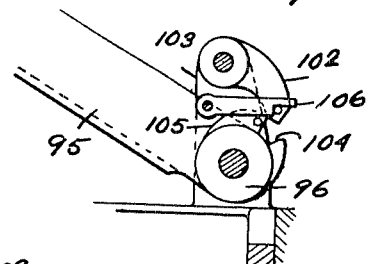
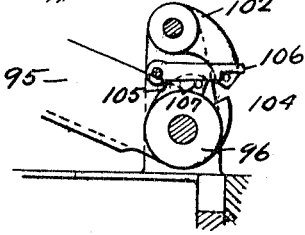

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

BARREL-WELDING MACHINE.

1,118,327.   Specification of Letters Patent.   Patented Nov. 24, 1914.

Application filed January 19, 1914. Serial No. 812,905.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Barrel-Welding Machines, of which the following is a specification.

This invention relates primarily to autogenous flame welding apparatus, and is designed more particularly for the purpose of welding the longitudinal seams of metal barrels or other tubular bodies. The present case constitutes a continuation in part of my prior application for gas welding and cutting machine, filed July 12, 1912, Serial Number 709,079, patented January 20, 1914, Number 1,084,692, wherein one of the modified forms illustrated was organized for barrel welding, claims as to this construction being reserved, however, for a later application. It also constitutes a form of apparatus for carrying out the process constituting the subject-matter of my application filed December 10, 1912, Serial Number 735,909, also divided out of application Number 709,079.

In general, the object is to provide a conveniently operated machine whereby tubular bodies may be welded in an expeditious and effective manner.

The invention comprises numerous features of construction and combinations of parts, which can best be pointed out in the following description and will be more especially indicated in the appended claims.

In the accompanying drawings: Figure 1 is a side elevation showing the torch mechanism part of the machine; Fig. 2 is a side elevation, partly in section, showing the work-support; Fig. 3 is a plan view of the torch mechanism part; Fig. 4 is a plan view of the work support; Fig. 5 is a view, partly in vertical section and partly in elevation, showing the work-support with a tubular body mounted thereon; Figs. 6 to 8 are detail enlarged views, illustrating in different positions the means for holding and releasing the clamps; Fig. 9 is a detail sectional elevation, illustrating one of the adjustments; and Fig. 10 is a view, partly in vertical section and partly in elevation, looking at the front end of the upper torch-bearing arm.

An elongated base 10 is preferably provided for supporting the torch mechanism, indicated generally by the letter T, and the barrel-holding mechanism, indicated generally by the letter B. The torch mechanism includes a standard or column 11 at one end of the base, its lower end being shown as mounted in a gear casing 12. On this standard is a vertically adjustable carriage having collar portions 13 encircling the column and portions 14 at the side of and extending rearward from the column. The vertical adjustment of the carriage may be effected in any desired way, as by means of a rack 24 on the column meshed by a pinion 25 on the carriage, the shaft 25$^a$ of this pinion being adapted to receive a suitable operating handle. The desired vertical adjustment may be held by tightening the collar portions 13, which are split and provided with bolts as shown. The carriage portions 14 afford bearings for spaced upper and lower horizontal arms 15 and 16. As shown, these arms are in the form of horizontally-elongated, vertically-disposed plates, which are applied against the vertical outer faces of the carriage portions 14, the upper and lower edges of the arms being retained by overlapping guides 17. The rear ends of these arms, that is to say their portions behind the standard 11, are united, so that they constitute a bifurcated structure guided for horizontal movement on the primary supporting structure, which, in the present instance, may be regarded as comprising the parts 10, 11 and 12. To this end a filler piece 18 is interposed between and connected to horizontal strengthening flanges 19 on the arms. Independent longitudinal adjustment of the arms is provided for by forming one of them with a rack 20, which is engaged by a pinion 21 carried by the filler piece 18, the shaft of the pinion being provided with a squared end 22 for the application of a suitable handle. The adjustment when effected is held by bolts or other suitable devices 23, connecting the parts 16 and 18 and operating in slots in one of them.

Mechanical means are provided for driving the torch-bearing arms 15, 16 in unison and in a continuous and uniform manner, either by hand or from a source of power. The driving mechanism illustrated is capable of operation in either manner. In the particular construction shown, a pulley 26, adapted to be belted to any source of power, is mounted on a horizontal shaft 27, which extends into the interior of the gear case 12 and there carries a friction disk 28. A vertical shaft 29 is disposed parallel and adjacent the column 11, its lower portion being journaled in a suitable bearing in the gear case 12 and its upper portion finding a bearing in a bracket 30 mounted on the vertically adjustable carriage 13, 14. On the lower end of the shaft 29, within the gear case, is a friction wheel 31, which is driven by the disk 28 and may be shifted up and down on its shaft 29 to vary the speed, as desired. To this end a convenient speed changing and indicating mechanism is provided, comprising a rack-toothed sleeve 32 movable vertically, though not rotatable, with the friction wheel 31, together with a pinion 33 meshing with the rack teeth, this pinion being on a horizontal shaft on the gear case and having a handle 34. By means of this handle the said pinion can be manually rotated and the friction wheel 31 raised or lowered to the degree corresponding to the desired speed of drive; and in order to enable the speed to be varied by uniform degrees and in such manner as to afford a visual indication, there is provided a stationary disk or plate 35, having equidistant, circularly-arranged openings 36 to be engaged by a pin 37 on the handle. A handle 38 is provided for moving the disk 28 into and out of engagement with the wheel 31, in a manner similar to that shown in my previous application referred to and therefore unnecessary to be specifically illustrated in this case.

The illustrated gearing for driving the bifurcated structure 15, 16, 18 from the vertical shaft 29 will now be described. A worm 39 is suitably mounted on the bracket 30 of the vertically movable carriage, so as to partake of the vertical movement of the latter, and is splined to the shaft 29, so as to be movable up and down on said shaft while preserving its driving engagement therewith. The said worm meshes with a worm wheel 40 supported by brackets 41, 42 on the vertically movable carriage, which worm wheel may be coupled with a pinion 43 by means of a clutch 44, the construction and operation of which it is not necessary to describe particularly as such expedients are well known. The pinion 43 drives idle pinions 45, 46, which are mounted on the vertically movable carriage, and the latter of which meshes with a rack 47 fixed to the arm 15. A hand wheel 48 is united with the pinion 43, so that the torch-bearing arms can be driven by hand if desired. It will be understood that by observing proper proportions it is perfectly possible to drive the torch-bearing structure by hand in a mechanical and uniform manner. The said torch-bearing structure may be driven backward as well as forward by the power drive (by shifting the wheel 31 from one side to the other of the center of the disk 28), or the power drive may be used for moving the structure forward in the welding operation, the return movement being effected by the hand drive, the power drive being then unclutched. It will be understood that as long as the essentials of continuous and uniform driving for the welding operation are preserved, the details of the driving mechanism may be widely varied.

Autogenous welding torches 49 and 50, of suitable construction, are mounted on the forward ends of the arms 15 and 16. These torches may burn a mixture of oxygen and acetylene, for example, the gases being supplied through flexible tubing in the usual manner. The nature and operation of such torches are well understood and call for no particular description here. The torches are reversely directed, so as to operate upon opposite sides of the work, which is received between them and in the space afforded between the two torch-supporting arms. In action the torches are in convergent relation, as indicated, being inclined forward in the direction in which the weld proceeds. Best results are secured when one of the torches is slightly in advance of the other, the lower torch being preferably the one which is so advanced. This relative positioning of the torches is provided for in the present construction by the rack and pinion adjustment 20, 21 between the two arms 15 and 16.

The torches are mounted removably in suitable holders 51, 52, which are adjustably mounted on the torch-supporting arms in such manner as to permit accurate adjustment of the torches vertically, toward and from the work, and transversely with respect to the line of operation. As shown, the holders are preferably in the form of simple split collars, in which the torches may be slidably inserted and clamped by tightening a screw or bolt connecting the ears at opposite sides of the split (see Figs. 1 and 3). The slidability of the torches in their frictional clamping holders thus admits of a rough adjustment of the welding flames in a vertical plane toward and from the work. Such holders and the rough adjustment permitted thereby are known in the art. In the preferred construction, the torch holders are carried, through intermediate connections presently to be described, by torch-bearing members 53, 54, which are adjustable rectilinearly to secure one of the fine adjustments of the torch and rotatably for the other fine adjustment. These adjustments will now be described. In the particular construction shown, vertical spindles or pivot members 55, 56 (see Figs. 1 and 10) are mounted slidably in bearing brackets 57, 58 on the forward ends of the slide arms 15 and 16, and the torch-bearing members 53, 54 are carried by and rotatable on these pivot members, slow motion mechanisms being provided for raising and lowering and for turning the torch-bearing members. The preferred construction of these parts for the upper arm is shown more particularly in Fig. 10, and it will be understood that the construction of the corresponding parts on the lower arm is, or may be, substantially identical. In this view, the upper end of the pivot member 55 is seen reduced and threaded, at 59, for engagement by a hand-adjusting nut 60. By means of this nut the pivot member can be accurately raised and lowered and with it the torch-bearing member 53, the latter being confined between collars 61, 62 on the pivot member. An arm 63 projects laterally from the torch bearing member for connection with the mechanism presently to be described for effecting rotary adjustment of the torch-bearing member, with consequent lateral adjustment of the torch nozzle. Thus, it will be seen that the fine adjustment of the upper torch toward and from the work is a vertical straight line movement, which is effected by turning the nut 60 (Fig. 10) in one direction or the other; according as it is desired to raise or lower the torch. Since the nut engages the threaded portion of the pivot 55, the turning of the nut moves the pivot vertically in its bearings 57 on the end of the slide arm; and the torch bearing member 53 moves vertically with the pivot because it is confined between the collars 61 and 62 thereon. Vertical adjustment of the lower torch is effected in a similar way, the nut being formed externally as a bevel gear 84. The adjustment of the torch transverse to the line of travel is effected by turning the torch bearing member 53 slightly about its vertical movement. This swings the torch, which is supported in advance of the member, laterally, the result being substantially the same as if the torch were moved crosswise in a straight line. This adjustment is the same for both torches.

The fine adjustment mechanisms are constructed and arranged in such manner as to permit the torches to be adjusted simultaneously and also independently, and to dispose the several hand-operating devices at one region of control, that is to say, the forward part of the upper torch-bearing arm. In the particular construction shown, upper and lower rotary shafts 64 and 65 are mounted in suitable bearings on the two slide arms 15 and 16, and at their forward ends have screw-threaded engagement, as indicated at 66 (see Fig. 9), with longitudinally-movable upper and lower connections 67, 68. The latter are flexibly connected by respective links 69 and 70 with the lateral arms 63 on the rotatable torch-bearing members 53, 54. A knurled wheel 71 on the forward portion of the upper shaft 64 affords manual means for rotating both shafts and thereby producing longitudinal movement of the connections 67, 69 and 68, 70, thus turning said torch-bearing members and producing lateral movement of both torch nozzles. For this purpose the rear ends of the rotary shaft 64, 65, which extend to the rear slide ends of the arms 15 and 16, are connected for simultaneous movement by a suitable cross-connection, such as a sprocket chain 72 passing over sprocket wheels 73, 74. In order to permit the upper torch to be adjusted laterally independently of the lower torch, the link 69 is formed in two sections, the inner ends of which are oppositely screw-threaded and engaged by a hand wheel nut 75, after the manner of a turnbuckle, thus enabling this link to be accurately lengthened and shortened. This operation, as will be readily understood, causes the upper torch to swing laterally above the pivot 55, without affecting the lower torch. In order to allow for the relative horizontal and vertical movements of the parts, the links 69 and 70 are provided at both ends with both vertical and horizontal pivots, or universal joints, as indicated at 76 (Fig. 1).

Vertical adjustment of the lower torch from the common region of control is also provided for by a train of operating connections extending rearward along the upper slide arm 15 across to the lower arm 16, and thence forward along the latter. As shown, a rotary shaft 77 is disposed longitudinally in suitable bearings on the upper arm 15, and is connected with a similar shaft 78 on the lower arm by a suitable connection at the rear ends of these arms, such as a sprocket chain 79 engaging sprockets 80 and 81 on the respective shafts. Both these sprockets and the sprockets 73, 74 may be splined on their shafts, so as to enable them to be moved longitudinally thereon to compensate for relative longitudinal adjustment of the arms 15 and 16. The forward end of the upper shaft 77 is provided with an operating hand wheel 82, and the forward end of the lower shaft 78 has a bevel gear 83, which meshes with a corresponding gear formed on the nut 84 for producing vertical adjustment of the lower pivot member 56.

The torch holders 51, 52 are supported in advance of the torch-bearing members 53, 54 by means of forwardly projecting arms 85, which are preferably connected by horizontal pivots with the torch holders 51, 52 on the one hand and the torch-bearing members 53, 54 on the other. These connections enable the torches to be disposed at various angles and also afford an additional, rough vertical adjustment, since the torch holders can be tilted on the forward ends of the arms 85, while the latter are tiltable with respect to the members 53, 54. It will be understood that these pivots are provided with nuts or other suitable means for preventing movement except when desired.

In order to prevent injury to one of the torch nozzles by the flame of the other after the jets have been lighted and before the work is interposed between them, means are provided for quickly throwing one of the torches into and out of coöperative relation to the other torch (see particularly Figs. 3 and 10). For this purpose the upper torch-bearing member 53 is shown provided with a laterally-projecting supporting arm 86, on the outer part of which a transverse, vertically swinging arm 88 is pivoted, as shown at 87. To the free end of this latter arm, which free end is preferably disposed directly in front of the torch-bearing member 53, is connected the rear end of the upper forwardly projecting arm 85. The corresponding arm 85 of the lower torch, on the contrary, may be secured directly to the lower torch-bearing member 54 and is so indicated. A lug 89 on the arm 86 constitutes a rest for supporting the swinging arm 88 in normal position (shown in full lines in Fig. 10), while another lug 90 is arranged so as to sustain the same when thrown up to inoperative position, indicated by dotted lines. This transverse vertical swinging movement, as will be readily understood, removes the upper torch to a considerable distance from the lower torch, and the operations, both of throwing the torch out of the way and of returning it to coöperative relation with the lower torch, are susceptible of being easily and quickly performed by the attendant.

The barrel-supporting mechanism B includes a head 91, which is mounted in a suitable manner to rotate about a vertical axis on a pedestal or standard 92 rising from the base 10. This head carries laterally-projecting means on which to hang the tubular bodies 93 with their longitudinal seams presented to the action of the coöperative welding torches. By rotation of the work support a welded body is removed from operative alinement with the welding mechanism, so that it can be conveniently taken off its support, and a fresh body is brought into position to be welded. The body to be welded is placed over a slotted support, consisting of a pair of laterally spaced arms 94, there being preferably two pairs of these arms projecting at diametrically opposite sides of the head. The body is placed on a pair of these arms, with its seam uppermost, and the portions of the body adjacent the seam are held against the arms by means of longitudinal clamps 95, which are hinged at their rear ends, as shown at 96, to the rear ends of the said arms. The clamps are secured by suitable devices 119 at their forward ends, and when released preferably assume a bowed form, as indicated in dotted lines in Fig. 2, so as to insure a substantially uniform holding throughout their length when they are held down by the said devices. It will be understood that the metal of these clamps is sufficiently flexible to permit of their straightening. The torches operate in the spaces between these clamps and arms, respectively; and in order to permit the distance between the parts to be varied in accordance with conditions, the said arms, carrying the clamps, are adjustable toward and from each other on the head 91, as by means of bolts 97 connecting the arms to the head and passing through slots in one of the parts, as indicated.

Rotation of the barrel support is conveniently effected by a laterally-projecting handle 98 on the head, and the degree of turning is exactly limited by a spring bolt 99 carried by the pedestal for engagement with diametrically opposed sockets 100 in the bottom of the rotary head. This bolt or detent automatically arrests the barrel support when turned a sufficient distance, to cause one of the pairs of arms 94 to take up the operative position just vacated by the other pair of arms. Disengagement of the bolt may be conveniently effected by a foot lever 101.

Means are provided for automatically engaging and holding the clamps in raised position, so as to facilitate the introduction and removal of the tubular bodies. To this end the devices more particularly shown in Fig. 6 are employed. The said devices comprise a pivoted gravity dog or detent 102 mounted on a bracket 103 projecting upward from the head, there being one of these dogs for each clamp. When the clamp is raised, the end of the said detent automatically falls into engagement with a shoulder 104 on the hinge portion of the clamp. To disengage the detent, the clamp is first raised to a further extent, thus causing a cam projection 105 on the clamp to swing the dog 102 rearward, where it is automatically engaged by a gravity detent 106 also pivoted on the bracket 103. The clamp may now be lowered, and in so doing, a pin 107, carried by the clamp, lifts the detent 106, so as to disengage the dog 102. By this time, however, the shoulder 104 has moved to a position where it cannot be engaged by the said dog, which is, however, in condition to engage and hold the clamp when again elevated.

Means are provided for cooling the arms 94, so as to prevent them becoming unduly heated by the proximity of the welding flames. To this end the arms are made hollow, as shown, and provisions are made for supplying and circulating water through their interiors. In the construction shown, a supply tank 108 is mounted on top of the rotatable head 91, and is provided with outlet pipes 109, which deliver into the rear ends of the arms. Pipes 110 lead from discharge openings in the bottoms of the arms, near the outer ends of the latter, and extend backward along these arms, being bent downward at their inner ends to discharge into a receiving tank 111. Water may be supplied to the tank 108 and drawn off from the tank 111 in any suitable manner.

A gage for the edge of the seam is mounted on one of each pair of clamps 95. In the particular construction shown, a rock-shaft 120 is journaled in suitable bearings on a clamp and is provided with curved gage fingers 121, which may be swung upward out of the way or downward into the slot between the work-holding devices. When in this position, one portion of the barrel body, which is held by its clamp against the underlying arm, may be pushed forward until its edge contacts with the alined extremities of the gage fingers, thus insuring the proper location and alinement of the seam.

Means are provided for adjusting the lips of the seam of the body 93 toward each other. This is important more particularly at the rear end of the body, that is to say, the part remote from the point where welding commences, inasmuch as at this region there is a tendency for the edges of the still unwelded portions of the seam to draw apart as the welding proceeds from the far end. To this end devices are provided for gripping the sheet metal being operated upon and adjusting it transversely of the seam. In the particular construction shown, two arms 112 are fulcrumed at 113 on each side of the standard 92. The said arms extend upward in divergent relation, and at their upper ends bear pairs of pivoted, eccentric, gripping dogs 114. Rods 115 are pivotally supported at their inner ends, as shown at 116, and pass through guides 117 pivotally mounted on the arms 112. The outer ends of these rods are screw-threaded and bear adjustment nuts 118, the inner ends of which bear against the guides 117. Consequently, by turning these adjustment nuts the arms 112 are swung inward, causing their dogs 114 to grip the sheet metal at the rear end of the body and thus forcing the two edges of the seam toward each other.

At the beginning of operations, the bifurcated torch-supporting structure comprising the arms 15 and 16 is moved all the way to the rear, so as not to interfere with the rotation of the barrel support with the barrel bodies thereon. A barrel body is placed on the pair of arms 94 remote from the welding mechanism, and there held by clamps 95. The seam is thus disposed uppermost in such manner as to be exposed to the action of the upper and lower torches. The barrel support is now rotated, so as to bring this body into operative alinement with the welding mechanism. The gases are now turned on and the jets emerging from the torch nozzles are lighted, the upper torch 49 being thrown backward out of the way. The torch-supporting structure is now set in motion forwardly and the lower torch nozzle enters beneath the wall of the barrel, its flame playing upon the edges of the seam. The upper torch is immediately swung down into operative position, and the two torches are then caused to progress in a continuous and uniform manner along the length of the seam, welding the latter simultaneously from both sides, with the advantages set forth in my copending applications Serial Number 709,079, filed July 12, 1912, and Serial Number 735,909, filed December 10, 1912. If the edges of the seam at the far end of the barrel tend to separate as the welding progresses, the devices shown more particularly in Fig. 5 may be utilized for forcing them together. When the entire seam has been welded, the gases are shut off and the torch-supporting structure is moved backward. The barrel support may now be rotated to carry the welded barrel to a position where it can be conveniently removed, at the same time bringing a fresh body into position to be welded.

While I have described the preferred embodiment of my invention with particularity, it is to be understood that numerous changes may be made without departing from its scope and that various features may be omitted without destroying the usefulness of the remainder. Moreover, as to any of the features which may be susceptible of use in machines for welding other kinds of work, or even for gas cutting machinery, I do not wish to limit myself to the particular application disclosed.

I may call attention to the fact that while the barrel-supporting arms 94 are shown open, their tops may be closed if desired; also, that the tops of these arms may be flat instead of formed on a curve, as shown. I would also point out that the machine may be used for welding flat work if desired, the separate sheets being held between the arms and clamps of the work holder.

What I claim as new is:

1. In an apparatus for welding metal barrel or other tubular bodies, the combination of a rotatable support having a pair of arms on which to place the body with its seam exposed both outside and inside, a bifurcated solidly supported and guided structure adapted to be advanced and retracted with its members at opposite sides of the wall of the body, reversely disposed autogenous welding torches carried by the members of said structure so as to direct their flames upon the seam, and mechanical means for driving said structure.

2. In an apparatus for welding metal barrel or other tubular bodies, the combination of a work support having radial arms on which to place the bodies, solidly supported and guided arms adapted to receive the wall of a body between them, autogenous welding torches on said arms for directing their flames upon opposite sides of the seam, and means for advancing and retracting the torch-bearing arms, said work support being rotatable to bring the bodies successively into position to be welded.

3. In an apparatus for welding metal barrel or other tubular bodies, the combination of a support rotatable about a vertical axis and having lateral means for holding the bodies horizontally, solidly supported and guided arms adapted to be advanced endwise into and outside of the body in welding position and to be withdrawn in the reverse direction, means for moving said arms in unison, and coöperating autogenous welding torches carried by said arms to act upon the seam at opposite sides.

4. In an apparatus for effecting autogenous flame welding of metal barrel or other tubular bodies, the combination of a work-support having means projecting horizontally therefrom for holding a tubular body, a rigid torch-supporting structure having spaced arms, reversely directed autogenous welding torches carried thereby to play upon opposite sides of the body seam, and mechanism for effecting uniform and continuous relative drive between said torches and body, said torches remaining in fixed coöperative relation throughout the operation.

5. In an apparatus for effecting autogenous flame welding of metal barrel or other tubular bodies, the combination of a work-support having a pair of horizontally-projecting laterally-spaced arms on which to hang a tubular body, clamps coöperating therewith, a rigid torch supporting structure having spaced arms, reversely directed autogenous welding torches carried thereby to play upon opposite sides of the body seam, and mechanism for effecting uniform and continuous relative drive between said torches and body, said torches remaining in fixed coöperative relation throughout the operation.

6. A machine for effecting autogenous flame welding of metal barrel or other tubular bodies, comprising a base, a standard rising therefrom, horizontally-projecting upper and lower arms on said standard, and reversely directed autogenous welding torches carried by said arms, in combination with a second standard mounted on the base, means projecting horizontally therefrom for holding a tubular body with its seam in relation to be acted upon at opposite sides by said torches, and driving mechanism for causing the welding by the two flames to progress continuously and in unison lengthwise of the seam.

7. In an apparatus for effecting autogenous flame welding of metal barrel or other tubular bodies, movable torch-supports carrying reversely directed autogenous welding torches and adapted to pass respectively inside and outside of a tubular body, means for solidly supporting and guiding said supports for parallel movement, and mechanism for driving said torch supports in unison in a continuous and uniform manner, in combination with suitable means for holding a tubular body with its seam in relation to be acted on inside and out by said torches, and a revoluble support for said body-holding means whereby the body may be swung into and out of operative relation to the torch mechanism.

8. A machine for effecting autogenous flame welding of metal barrel or other tubular bodies, comprising an elongated base, a standard at one end of said base, laterally projecting spaced arms guided for horizontal movement on said standard, autogenous welding torches carried by said arms and adapted to play upon opposite sides of a seam, and mechanism for driving said arms, in combination with a second standard at the other end of said base, and lateral body-supporting members revolubly supported by and projecting at different sides of said second standard, whereby by rotating said members a welded body may be moved out of and a new body brought into operative position with reference to the torch-bearing arms.

9. A machine for effecting autogenous flame welding of metal barrel or other tubular bodies, comprising a standard, a bifurcated structure guided for horizontal movement on said standard, autogenous welding torches carried by the arms of said structure to act upon opposite sides of a seam, and mechanism for driving said structure, in combination with a work-support revoluble about a vertical axis and having means for holding tubular bodies in radial positions with their seams presented successively to the action of said torches.

10. A machine for effecting autogenous flame welding of metal barrel or other tubular bodies, comprising a work-support having a pair of spaced projecting arms adapted to enter inside a tubular body placed thereon, longitudinal clamps hinged to the rear portions of said arms to hold the portions of the body adjacent the seam, and means whereby said arms may be adjusted toward or from each other, in combination with outer and inner autogenous welding torches adapted to direct their flames upon the seam from above and below between said clamps and arms respectively, suitable means for solidly supporting said torches, and mechanism for effecting relative drive between the torches and work support.

11. In a machine for welding barrel or other tubular bodies and in combination with welding mechanism, a work-support having laterally-projecting means on which to hang a tubular body, clamps coöperating therewith to hold the portions of the body adjacent the seam against said means, and means comprising jaws for gripping the thickness of the wall of the body between them and adjusting the edges of the seam toward each other.

12. In a machine for welding barrel or other tubular bodies and in combination with welding mechanism, a work-support having laterally-projecting means on which to hang a tubular body at the portions thereof adjacent the seam, devices at the rear end of said means adapted to grip the thickness of the wall of the body between them, and means acting on said devices to effect relative adjustment of the edges of the seam.

13. In a machine for welding barrel or other tubular bodies and in combination with welding mechanism, a work-support having laterally-projecting means for supporting and holding a tubular body at the portions thereof adjacent the seam, a pivoted arm adjacent the rear end of said means, gripping dogs thereon adapted to grip the wall of the body at the rear end adjacent the seam, and a screw acting on said arm to adjust the edge of the seam.

14. In a machine for welding barrel or other tubular bodies and in combination with welding mechanism, a work-support having laterally-projecting means on which to hang a body, longitudinal clamps overlying said means and hingedly supported at their rear ends, and mechanism for holding said clamps in elevated position and releasing the same, said mechanism comprising a dog adapted to hold an arm raised, means on the clamps adapted to disengage said dog from the arm on further upward movement, a detent adapted to engage and hold the dog thus disengaged, and means on the clamp adapted to disengage said detent upon lowering of the clamp.

15. In a machine for welding barrel or other tubular bodies, a work-support having spaced horizontally-projecting arms, clamps coöperating therewith, a longitudinal rock-shaft mounted on one of said clamps, and gage members thereon adapted to be swung into and out of operative positions projecting into the space between said arms.

16. In barrel welding apparatus or the like, the combination of a suitable support, parallel arms projecting therefrom to receive a tubular body, longitudinal clamps hinged to the rear portions of said arms for holding the portions of said body adjacent the seam against said arms, and a seam gage movably mounted on one of said clamps.

17. In a machine of the character described, a work-support comprising a head rotatable about a vertical axis and having a laterally projecting arm on which to hang a tubular body, said arm being hollow, and means for supplying water to and conducting it from said arm.

18. In a machine of the character described, a work-support comprising an upright part having a laterally projecting arm on which to hang a tubular body, said arm being hollow, means for supplying water to the inner end of said arm, and means for conducting water away from the outer end thereof.

19. In a machine of the character described, a stationary support, a head mounted to rotate thereon about a vertical axis, body-holding arms projecting from said head, said arms being hollow, a water receptacle carried by said revoluble head and having conduits for supplying said arms, and discharge conduits leading backward along said arms.

20. In a gas welding or cutting machine having a suitable torch-supporting structure, means for effecting accurate adjustment of the torch toward and from the work and also transversely of the line of operation, comprising a member movably mounted and guided on said structure for rectilinear movement toward and from the work and also for rotary movement about an axis parallel to said rectilinear movement, a torch holder carried by said member, and slow motion gearings connected with said member to adjust the same rectilinearly and rotatably, respectively, the turning of the member causing the torch to swing transversely.

21. In gas welding or cutting apparatus and in combination with a suitable supporting structure, a torch-bearing member mounted movably thereon, a torch carried thereby with its nozzle in advance thereof, a slow motion device for effecting accurate vertical adjustment of said member, and another slow motion device for effecting accurate rotary adjustment of said member about a vertical axis so as to cause the torch to swing transversely.

22. In gas welding or cutting apparatus and in combination with a suitable supporting structure, a member mounted movably thereon, a torch carried by said member, screw-adjusting means acting upon said member, said member being mounted for rotary movement about the axis of said screw-adjusting means, and fine adjusting means for effecting said rotary movement of said member, whereby the torch nozzle may be adjusted accurately toward and from the work and transversely to the line of operation.

23. In gas welding or cutting apparatus and in combination with a suitable supporting structure, a pivot member mounted for axial movement on said supporting structure, a torch-bearing member mounted on said pivot member, a slow motion device for effecting axial adjustment of said pivot member and therewith the torch-bearing member, and another slow motion device for rotating said torch-bearing member on the pivot member.

24. In gas welding or cutting apparatus and in combination with a suitable supporting structure, a vertical spindle guided for vertical movement on said supporting structure, a hub carried by and rotatable on said spindle, a torch-holder projecting forward from said hub, an arm projecting laterally therefrom, slow motion mechanism for raising and lowering said spindle, and slow motion adjusting mechanism having flexible connections with said arm.

25. In gas welding or cutting apparatus and in combination with a suitable supporting structure, a vertical pivot member guided for vertical movement on said structure, slow motion mechanism for raising and lowering said pivot member, a torch-bearing member carried by and rotatable on said pivot member, slow motion mechanism for rotating said torch-bearing member, a torch holder, and a link supporting said torch holder from and in advance of said torch-bearing member and having horizontal pivotal connection with both.

26. The combination with a suitable primary support, of a bifurcated structure thereon, reversely directed torches carried by the outer portions of the arms of said structure and adjustable with respect thereto, slow motion adjusting mechanisms connected with said torches for effecting similar adjustments thereof transversely to the line of operation of the torches, and common operating connections between said mechanisms.

27. The combination, with a suitable primary support, of a bifurcated structure thereon, reversely directed torches carried by the outer portions of the arms of said structure and adjustable with respect thereto, slow motion adjusting mechanisms connected with said torches for effecting similar adjustments thereof, common operating connections between said mechanisms, said connections comprising shafts extending lengthwise of said arms, and gearing connecting the rear ends of said shafts.

28. The combination with a suitable primary support, of a bifurcated structure thereon, torch-bearing members carried by the outer portions of said arms and transversely adjustable in parallelism, fine adjusting devices connected with said members, operating connections extending lengthwise of said arms, and a connection therebetween at the rear portions of said arms.

29. The combination with a suitable primary support, of spaced upper and lower arms thereon, torch holders mounted on the forward portions of said arms, mechanism for effecting simultaneous adjustment of said torch holders relatively to said arms, said mechanism including connections extending rearward along the arms and a common connection at the rear portions thereof, and an independent adjusting device for the upper torch holder interposed in the upper line of connections.

30. The combination with a torch-supporting structure having torch-supporting portions affording a space between them for the reception of the work, reversely directed torches mounted adjustably on said portions, mechanism for effecting simultaneous adjustment of said torches relatively to said portions and transversely of the line of operation of the torches, and means for effecting similar adjustment of one of said torches independently of the other.

31. The combination with a suitable primary support, of spaced laterally-projecting arms thereon, torch holders mounted on the outer portions of said arms, and mechanism for effecting accurate adjustment of the torch holder on one of said arms including a suitable hand device on the other arm and a train of connections having portions extending along both arms and a cross connection therebetween.

32. The combination with a suitable primary support, of spaced upper and lower arms thereon; torch holders mounted for vertical and transverse adjustment on the forward portions of said arms; slow motion mechanisms for effecting vertical adjustment of said torch holders, including suitable hand devices for operating the same on the forward portion of the upper arm, and a train of operating connections extending from one of said devices rearward along the upper arm, across to the lower arm and forward along the lower arm to effect the vertical adjustment of the lower; and slow motion mechanism for effecting simultaneous transverse adjustment of said torches having a suitable hand device on the forward portion of the upper arm and operating connections extending along both arms and a cross connection at the rear portions of the same.

33. The combination with a suitable primary support, of a torch-supporting structure having spaced portions adapted to receive the work between them, convergently-directed coöperative welding torches adjustably mounted on the forward parts of said portions, an arm carrying one of said torches and having loose pivotal connection with the corresponding supporting portions, and stops coöperative with said arm and adapted to sustain the same respectively in normal position with its torch in coöperative relation to the other torch and in a position with its torch thrown out of action.

34. In an autogenous welding machine, a bifurcated torch-supporting structure, adjustable members mounted on the forward portions of the arms of said structure, torch holders carried by said members, and mechanisms for effecting accurate vertical and transverse adjustments of said members, in combination with an arm carrying one of said torch holders and pivoted loosely on the corresponding torch-bearing member to swing in a plane transverse to said torch-supporting structure, whereby said torch holder with its torch may be quickly shifted into and out of operative position.

35. In an autogenous welding machine, the combination with a torch-supporting structure having spaced portions adapted to receive the work between them, torch-holders supported by said portions and adapted to receive torches directed in convergent relation upon the work between, an arm carrying one of said holders and having loose pivotal connection with the corresponding supporting portion whereby the arm and torch-holder may be swung vertically out of the way in a direction transverse to the line of action of the torches, and means for limiting the movement of said arm in opposite directions and sustaining the same in operative and inoperative positions respectively.

36. The combination with a suitable primary support, of a pair of horizontal arms guided for longitudinal movement on said support, torch holders carried by the forward portions of said arms, a filler piece interposed between and connecting said arms, and gearing for adjusting one of said arms relatively to said filler piece.

37. A base, a standard thereon, a torch, means supporting said torch from said standard for horizontal guided movement, and mechanism for driving said torch comprising a vertical driving friction disk at the base of the standard, a horizontal driven friction wheel engaging said disk, and a vertical shaft extending upward from said wheel, in combination with a rack connected to said friction wheel, a pinion meshing therewith, a handle connected to said pinion, and a dial having a circular series of openings adapted to be engaged by said handle.

38. In welding apparatus, the combination with autogenous flame welding means, of a work-support comprising laterally-projecting horizontally-spaced arms and longitudinal clamps coöperating with said arms to hold the portions of the work adjacent the seam, and mechanism for producing relative movement between said welding means and the work-support longitudinally of the space between the arms and clamps.

39. In apparatus for welding barrel or other sheet metal tubular bodies, a substantially horizontal support comprising elongated members separated by a longitudinal slot and adapted to be received within the bodies and to underlie and support the wall portions thereof at opposite sides of the edges to be welded, and longitudinal clamps to hold these two wall portions against said members.

40. In apparatus for welding barrel or other sheet metal tubular bodies, a substantially horizontal support comprising members separated by a longitudinal slot and adapted to receive the bodies to be welded with the edges thereof over the slot, and longitudinal clamps to hold the two portions of the body against said members, said clamps being mounted to swing about their rear ends and having means for holding their forward ends.

41. In apparatus for welding barrel or other sheet metal tubular bodies, a substantially horizontal support comprising members separated by a longitudinal slot and adapted to receive the bodies to be welded with the edges thereof over the slot, longitudinal clamps to hold the two portions of the body against said members, said clamps being mounted to swing about their rear ends, and clamping devices adapted to act upon the forward ends of the clamps to force and hold the same against the work.

In witness whereof I have signed my name in the presence of two subscribing witnesses.

WORTHY C. BUCKNAM.

Witnesses:
J. F. BRANDENBURG,
ELSIE GREENBERGER.